US011275280B2

(12) United States Patent
Lo

(10) Patent No.: US 11,275,280 B2
(45) Date of Patent: Mar. 15, 2022

(54) DISPLAY PANEL AND DISPLAY DEVICE

(71) Applicants: HKC CORPORATION LIMITED, Guangdong (CN); CHONGQING HKC OPTOELECTRONICS TECHNOLOGY CO., LTD., Chongqing (CN)

(72) Inventor: Hsu-Kang Lo, Chongqing (CN)

(73) Assignee: CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/634,510

(22) PCT Filed: Sep. 20, 2017

(86) PCT No.: PCT/CN2017/102488
§ 371 (c)(1),
(2) Date: Jan. 27, 2020

(87) PCT Pub. No.: WO2019/024191
PCT Pub. Date: Feb. 7, 2019

(65) Prior Publication Data
US 2020/0241345 A1 Jul. 30, 2020

(30) Foreign Application Priority Data
Aug. 1, 2017 (CN) .......................... 201710646763.7

(51) Int. Cl.
G02F 1/1368 (2006.01)
G02F 1/1345 (2006.01)
G09G 3/36 (2006.01)

(52) U.S. Cl.
CPC ........ *G02F 1/13454* (2013.01); *G02F 1/1368* (2013.01); *G09G 3/3648* (2013.01)

(58) Field of Classification Search
CPC combination set(s) only.
See application file for complete search history.

(56) References Cited

U.S. PATENT DOCUMENTS

2010/0060601 A1* 3/2010 Oohira .................. G06F 3/0412
345/173
2014/0078692 A1* 3/2014 Park ..................... H05K 1/0278
361/749

(Continued)

FOREIGN PATENT DOCUMENTS

| CN | 103680319 A | 3/2014 |
| CN | 104821138 A | 8/2015 |

(Continued)

*Primary Examiner* — Temesghen Ghebretinsae
*Assistant Examiner* — Sosina Abebe
(74) *Attorney, Agent, or Firm* — Muncy, Geissler, Olds & Lowe, PC

(57) ABSTRACT

The present disclosure provides a display panel and a display device. The display panel comprises an array substrate. The array substrate comprises a display area and a non-display area surrounding the display area. The display area comprises a plurality of active switches and a plurality of pixel units. The non-display area comprises a flexible circuit board and a fixing member. A first end of the flexible circuit board is disposed in the non-display area of the array substrate for driving the pixel units to display. The fixing member disposed on the flexible circuit board. The fixing member bends a second end of the flexible circuit board in a direction toward the display area of the array substrate, so that a projection of the flexible circuit board on the array substrate is located in the non-display area.

15 Claims, 4 Drawing Sheets

(56) References Cited

U.S. PATENT DOCUMENTS

2015/0036300 A1\* 2/2015 Park .................. G02F 1/1345
361/749
2016/0212839 A1\* 7/2016 Choi .................. H01L 27/3276

FOREIGN PATENT DOCUMENTS

| CN | 105009188 A | 10/2015 |
| CN | 105826353 A | 8/2016 |
| CN | 105977400 A | 9/2016 |
| CN | 106887186 A | 6/2017 |
| CN | 207008234 U | 2/2018 |
| KR | 20110095712 A | 8/2011 |

\* cited by examiner

DISPLAY PANEL AND DISPLAY DEVICE

BACKGROUND OF THE INVENTION

Field of Invention

An embodiment of this disclosure relates to the display technology, and more particularly to a display panel and a display device.

Related Art

With the development of display technology, the display effect of the liquid crystal display product is constantly improved, and thus the application of the liquid crystal display product becomes wider and wider.

Recently, in order to satisfy the user requirements, the narrow border or the borderless product has become the development trend of the liquid crystal display product. In the existing technology, achieving the narrow border or borderless feature generally needs to employ the gate on array (GOA) technology, that is, a gate driver of the panel is integrated onto the glass substrate. However, the technical threshold of the GOA technology is high, and the low production yield leads to the higher manufacturing cost.

SUMMARY OF THE INVENTION

The present disclosure provides a display panel and a display device to provide a low cost solution for achieving the narrow border.

In one embodiment, the present disclosure provides a display panel. The display panel comprises an array substrate. The array substrate comprises a display area and a non-display area surrounding the display area. The display area comprises a plurality of active switches and a plurality of pixel units. The non-display area comprises a flexible circuit board and a fixing member. A first end of the flexible circuit board is disposed in the non-display area of the array substrate for driving the pixel units to display. The fixing member disposed on the flexible circuit board. The fixing member bends a second end of the flexible circuit board in a direction toward the display area of the array substrate, so that a projection of the flexible circuit board on the array substrate is located in the non-display area.

In another embodiment, the present disclosure provides a display panel. The display panel comprises an array substrate. The array substrate comprises a display area and a non-display area surrounding the display area. The display area comprises a plurality of active switches and a plurality of pixel units. The non-display area comprises a flexible circuit board and a fixing member. A first end of the flexible circuit board is disposed in the non-display area of the array substrate for driving the pixel units to display. The flexible circuit board comprises a flexible substrate, and a driving chip disposed on the flexible substrate. The fixing member disposed on the flexible circuit board. The fixing member bends a second end of the flexible circuit board in a direction toward the display area of the array substrate, so that a projection of the flexible circuit board on the array substrate is located in the non-display area. The fixing member is disposed on one side of the flexible substrate provided with the driving chip. The fixing member has a cuboid shape, a cube with a transversal cross section of an I-shape or a U shape. Or, the fixing member is disposed on one side of the flexible substrate away from the driving chip. The fixing member has a U shape.

In still another embodiment, the present disclosure provides a display device. The display device comprises the display panel of the present disclosure.

In the display device of the present disclosure, the display panel is driven by adopting the flexible circuit board, and the fixing member is disposed on the flexible circuit board, so that the second end of the flexible circuit board is bent toward the display area of the array substrate, and the projection of the flexible circuit board on the array substrate is located in the non-display area of the array substrate to ensure the narrow border or borderless property of the display panel. However, a drive circuit or a driving chip of the display panel is manufactured on the flexible circuit board. So, compared with the GOA technology, the product yield is high, the production cost can be effectively reduced, and a low cost solution for achieving the narrow border is thus provided.

DETAILED DESCRIPTION OF THE INVENTION

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

The present embodiment provides a display panel. The display panel comprises an array substrate. The array substrate comprises a display area and a non-display area surrounding the display area. The display area comprises a plurality of active switches and a plurality of pixel units. The non-display area comprises a flexible circuit board and a fixing member. A first end of the flexible circuit board is disposed in the non-display area of the array substrate for driving the pixel units to display. The fixing member disposed on the flexible circuit board. The fixing member bends a second end of the flexible circuit board in a direction toward the display area of the array substrate, so that a projection of the flexible circuit board on the array substrate is located in the non-display area.

Specifically, a drive circuit or a driving chip for driving a display panel to display is disposed on the flexible circuit board. The drive circuit or the driving chip of the display panel is manufactured on the flexible circuit board. Compared with the GOA technology, the product yield is high and the production cost can be effectively reduced.

In the display device of the present embodiment, the display panel is driven by adopting the flexible circuit board, and the fixing member is disposed on the flexible circuit board, so that the second end of the flexible circuit board is bent toward the display area of the array substrate, and the projection of the flexible circuit board on the array substrate is located in the non-display area of the array substrate to ensure the narrow border or borderless property of the display panel so as to provide a low cost solution for achieving the narrow border.

This disclosure will be described in detail according to the preferred embodiment with reference to the drawings.

Figure 1A:
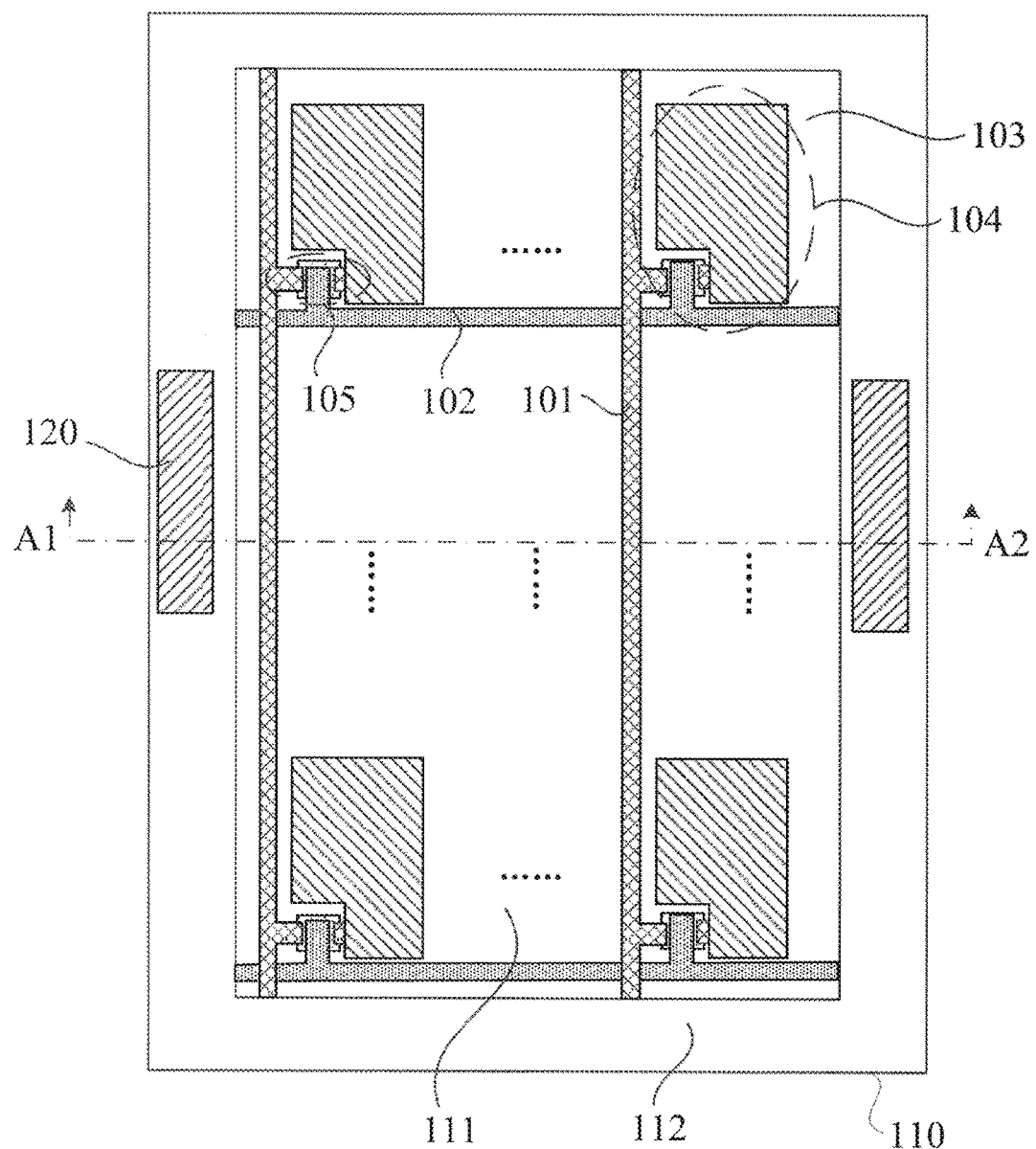
FIG. 1a is a schematic plane view showing a display panel in an embodiment of this disclosure.
Figure 1B:
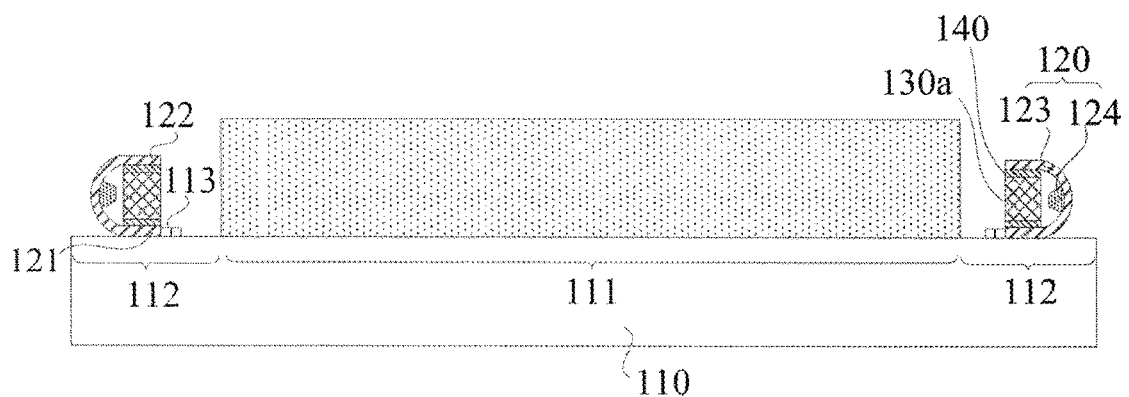
FIG. 1b is a schematically cross-sectional view showing the display panel in FIG. 1a taken along a line A1-A2.

FIG. 1a is a schematic plane view showing a display panel in an embodiment of this disclosure. FIG. 1b is a schematically cross-sectional view showing the display panel in FIG. 1a taken along a line A1-A2. Referring to FIGS. 1a and 1b, the display panel includes an array substrate 110. The array substrate 110 includes a display area 111 and a non-display area 112 surrounding the display area 111. The non-display area 112 includes a flexible circuit board 120 and a fixing member. A first end 121 of the flexible circuit board 120 is fixed in the non-display area 112 of the array substrate 110. The fixing member is disposed on the flexible circuit board 120.

Specifically, the display panel may be a liquid crystal display panel or an organic electroluminescent display panel. The array substrate 110 having a display area 111 for achieving frame displaying, and a non-display area 112, wherein a region corresponding to the non-display area 112 does not display a frame, and in general, a drive wire, a drive circuit board or the like for driving the display panel is provided. Multiple data lines 101 and multiple scan lines 102 are disposed inside the display area 111 of the array substrate 110, the data lines 101 and the scan lines 102 are perpendicular to each other to form multiple pixel areas 103, the pixel area 103 includes an active switch 105 and a pixel unit 104 for displaying an image, and the active switch 105 is, for example, a thin film transistor. A flexible circuit board 120 is disposed in the non-display area 112 of the array substrate 110, and a first end 121 of the flexible circuit board 120 may be electrically connected to the drive wire on the non-display area 112 of the array substrate 110 to drive the pixel unit 104 inside the display area 111 of the display panel to display. Exemplarily, referring to FIG. 1b, the first end 121 of the flexible circuit board 120 is electrically connected to a bonding pad 113 inside the non-display area 112, and the bonding pad 113 is connected to the drive wire on the non-display area 112 to facilitate the electric connection between the drive wire and the flexible circuit board 120.

It is to be noted that FIG. 1a only exemplarily shows the array substrate and the flexible circuit board, and does not show other structures of the display panel, and FIG. 1a only exemplarily shows a position and a shape of flexible circuit board. FIG. 1b does not show the specific structure of the array substrate but does not intend to restrict this disclosure.

Optionally, referring to FIGS. 1a and 1b, the flexible circuit board 120 comprises a flexible substrate 123, and a driving chip 124 disposed on the flexible substrate 123. The flexible circuit board 120 is, for example, a circuit board for driving the gate, and may also be a circuit board for driving the data line. The driving chip 124 is a gate driving chip or a source driving chip. Specifically, the driving chip 124 sends a scan signal or a data drive signal through the bonding pad 113 of the non-display area 112 of the array substrate 110 to the display panel, and drives the pixel unit 104 of the display area 111 of the display panel to display. The gate driving chip is used to send the scan signal to the display panel, the scan signal is used to turn on the pixel unit 104 inside the display area 111 line by line, the source driving chip is used to provide the data drive signal for the display panel, and the data drive signal is used to write the pre-displaying image signal into the pixel unit 104. Taking the liquid crystal display panel as an example, the pixel unit 104 includes a pixel electrode and a common electrode (not shown in the figure), the active switch 105 includes a source, a drain and a gate, the source is electrically connected to the data line 101, the drain is electrically connected to the pixel electrode of the pixel unit 104, and the gate is electrically connected to the scan line 102. The gate driving chip inputs the scan signal to the scan line 102 to turn on the active switch 105, and thus turn on the corresponding pixel unit 104. The source driving chip inputs the data drive signal to the data line 101, the data drive signal is written into the pixel electrode of the pixel unit 104 through the active switch 105, an electric field is formed between the pixel electrode and the common electrode to drive the liquid crystal to deflect, and the image displaying is thus achieved.

Optionally, referring to FIG. 1b, the fixing member is a first fixing member 130a. The first fixing member 130a is disposed on one side of the flexible substrate 123 provided with the driving chip 124. The first fixing member 130a is bonded to two ends of the flexible substrate 123 through a first adhesive layer 140.

The first fixing member 130a bends the flexible substrate 123 into a shape with a certain curvature through fixing two ends of the flexible substrate 123, so that a projection of the flexible circuit board 120 is located in the non-display area 112 of the array substrate 110. The first fixing member 130a may bend the flexible circuit board 120 into shapes with different curvatures according to requirements without any specific restriction.

Optionally, the flexible circuit board 120 is bent in a U shape. This arrangement allows a second end 122 of the flexible circuit board 120 fully bends to a direction toward the display area 111 of the array substrate 110, so that a projection of the flexible circuit board 120 on the array substrate 110 is located in the non-display area 112, to ensure the narrow border or borderless property of the display panel so as to provide a low cost solution for achieving the narrow border.

Optionally, the first fixing member 130a has a cuboid shape, and opposite two side surfaces of the first fixing member 130a are bonded to the two ends of the flexible substrate 123.

Specifically, the first fixing member 130a is configured as a cuboid, and the bending degree of the flexible substrate 123 may be adjusted by adjusting the size of each side of the first fixing member 130a. Exemplarily, the distance between the two side surfaces, to which the first fixing member 130a and the flexible substrate 123 are bonded, may be adjusted to adjust the bending curvature of the flexible substrate 123, the height of the flexible substrate 123 after bending and the like. It is to be noted that this embodiment only exemplarily shows the case where the first fixing member 130a has a cuboid shape, and it is not intended to restrict this disclosure. In other embodiments, the first fixing member 130a may also have other polygonal shapes.

Figure 2:
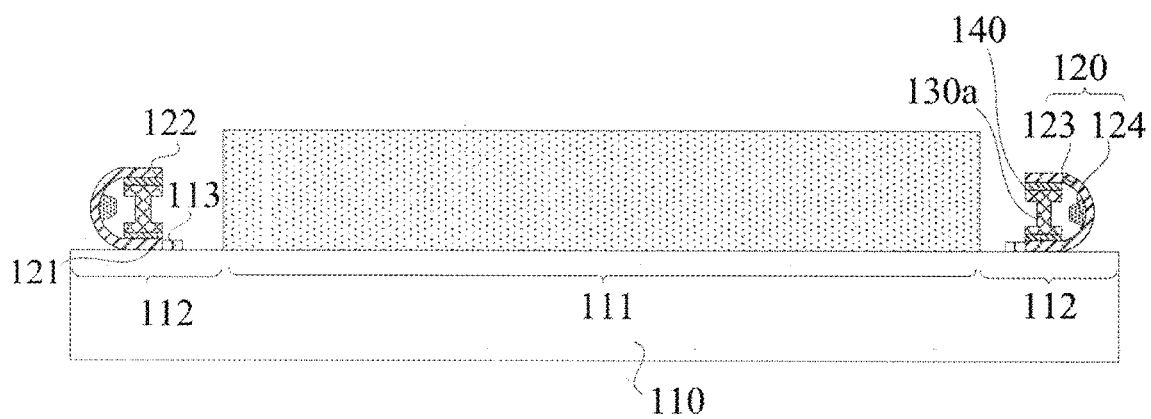
FIG. 2 is a schematically cross-sectional view showing still another display panel in an embodiment of this disclosure.

FIG. 2 is a schematically cross-sectional view showing still another display panel in an embodiment of this disclosure. Referring to FIG. 2, the first fixing member 130a may also be a cube with a transversal cross section of an I-shape, and a top surface and a bottom surface of the I-shaped cube are respectively bonded to the two ends of the flexible substrate 123. Specifically, the height of the I-shaped cube (i.e., the distance between the top surface and the bottom surface) may be adjusted to adjust the bending curvature of the flexible substrate 123, the height of the flexible substrate 123 after bending and the like. Since the I-shaped cube takes up less space, the I-shaped cube is employed so that after the flexible circuit board 120 is bent, the space available for the driving chip 124 is larger, so that the positional configuration of the driving chip 124 is more flexible.

Figure 3:
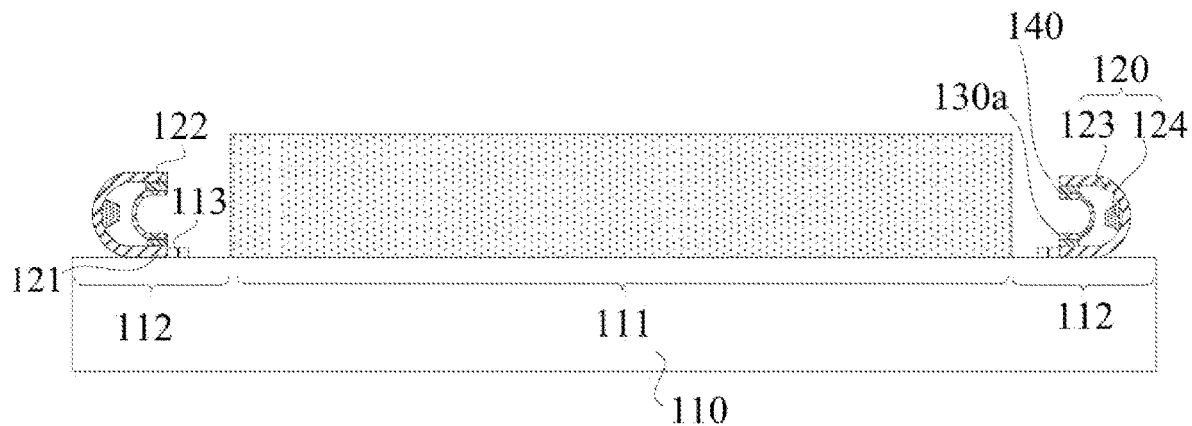
FIG. 3 is a schematically cross-sectional view showing still another display panel in an embodiment of this disclosure.

FIG. 3 is a schematically cross-sectional view showing still another display panel in an embodiment of this disclosure. Referring to FIG. 3, the first fixing member 130*a* may also have the U-shape. Upper and lower outer surfaces of the first fixing member 130*a* are respectively bonded to the two ends of the flexible substrate 123. By configuring the shape of the first fixing member 130*a* as the U-shape, the space available for the driving chip 124 is larger, and the positional configuration of the driving chip 124 is more flexible.

Figure 4:
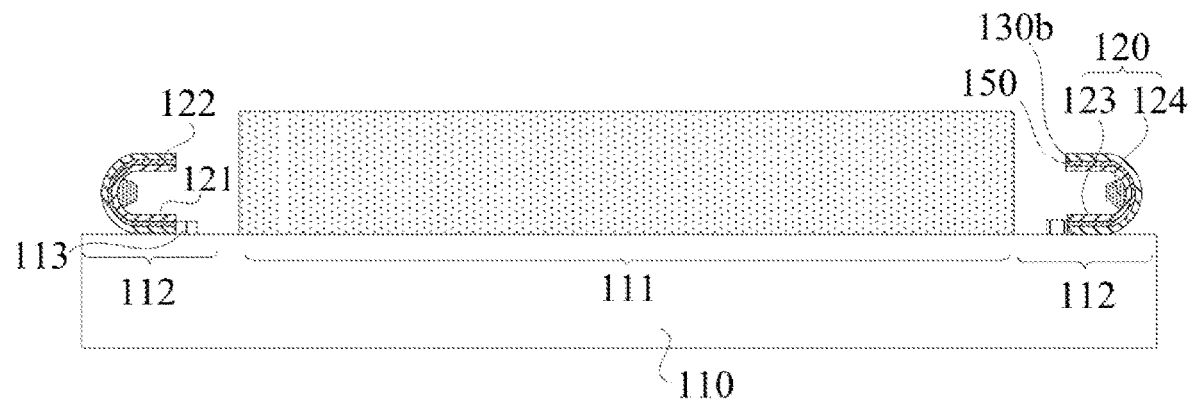
FIG. 4 is a schematically cross-sectional view showing still another display panel in an embodiment of this disclosure.

FIG. 4 is a schematically cross-sectional view showing still another display panel in an embodiment of this disclosure. Referring to FIG. 4, the fixing member may be a second fixing member 130*b*.

The second fixing member 130*b* is disposed on one side of the flexible substrate 123 away from the driving chip 124. The second fixing member 130*b* is bonded to the flexible substrate 123 through a second adhesive layer 150.

The second fixing member 130*b* may have an arbitrary shape. By fixing the second fixing member 130*b* and the flexible circuit board 120 together, the flexible circuit board 120 may be bent into a corresponding shape. The size of the second fixing member 130*b* may be set according to the size of the flexible substrate 123. Exemplarily, the size of the second fixing member 130*b* when it is unfolded to a flat surface may be equal to the size of the flexible substrate 123 when it is unfolded to a flat surface, so that the flexible circuit board 120 is better fixed. In addition, by disposing the second fixing member 130*b* on one side of the flexible substrate 123 away from the driving chip 124, the position and the size of the second fixing member 130*b* do not affect the driving chip 124, so that the positional configuration of the driving chip 124 of the flexible circuit board 120 is more flexible.

Optionally, the second fixing member 130*b* has a U shape, and an inner side of the second fixing member 130*b* is bonded to the flexible substrate 123. Specifically, by bonding the flexible substrate 123 to the inner side of the second fixing member 130*b*, the flexible substrate 123 is bent into a U-shape, so that the projection of the flexible circuit board 120 on the array substrate 110 is located inside the non-display area 112 to ensure the narrow border or borderless property of the display panel, and thus to provide a low cost solution for achieving the narrow border. It is to be noted that this embodiment only exemplarily configures the second fixing member 130*b* as a U-shape, and it is not intended to restrict this disclosure. In other embodiments, the second fixing member 130*b* may be configured as other arbitrary shapes according to the needs for the bending shapes of the flexible circuit board 120.

Optionally, the material of the fixing member is a rubber or foaming material. This arrangement allows the fastener to have some elasticity and cushioning properties. Such the configuration allows the fixing member to have a certain resilience and buffer properties. On the one hand, it is convenient for the fixing member to be assembled with the flexible circuit board 120; and on the other hand, the flexible circuit board 120 may also be protected.

Figure 5:
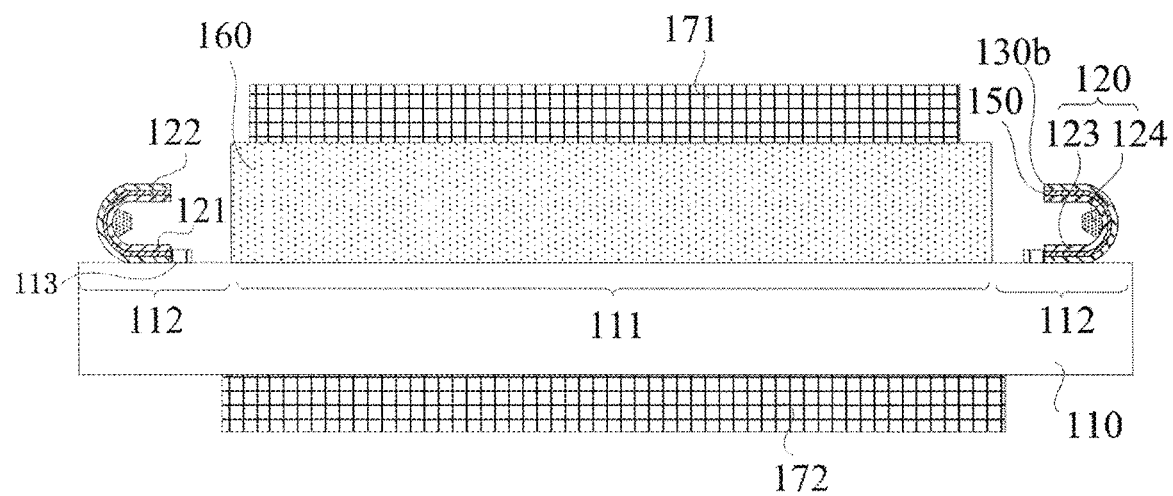
FIG. 5 is a schematically cross-sectional view showing still another display panel in an embodiment of this disclosure.

FIG. 5 is a schematically cross-sectional view showing still another display panel in an embodiment of this disclosure. Referring to FIG. 5, the display panel may also include: a color filter substrate 160 disposed opposite to the array substrate 110, and an upper polarizer 171 and a lower polarizer 172. The upper polarizer 171 is disposed on one side of the color filter substrate 160 away from the array substrate 110, and the lower polarizer 172 is disposed on one side of the array substrate 110 away from the color filter substrate 160. A color resistor layer and a black matrix are disposed on the color filter substrate 160. The color resistor layer includes multiple color resistor blocks having different colors, such as a red color resistor block, a green color resistor block and a blue color resistor block. The black matrix separates the color resistor blocks from each other, each color resistor block corresponds to one pixel unit on the array substrate 110, and the vertical projection of the black matrix on the array substrate 110 covers the data line, the scan line, the active switch and the like. It is to be noted that FIG. 5 only exemplarily shows the array substrate 110, the color filter substrate 160 and the upper and lower polarizers of the liquid crystal display panel, and does not show other structures, such as liquid crystal molecules and the like, but this does not intend to restrict this disclosure.

In this embodiment, illustrations will be made by taking a liquid crystal display panel as an example of the display panel. In other embodiments, the display panel may also be an organic electroluminescent display panel. For the organic electroluminescent display panel, the display panel may also includes a package layer for sealing an organic electroluminescent device on the array substrate to prevent water vapor and oxygen from eroding the organic electroluminescent device. For the rigid organic electroluminescent display panel, the package layer may be a hard glass package layer, and for the flexible organic electroluminescent display panel, the package layer may be a film package layer. The film package layer may be composed of an inorganic layer and an organic layer disposed at intervals. In addition, for the organic electroluminescent display panel, only the polarizer needs to be disposed on the light emitting side, that is, only the polarizer needs to be disposed on one side of the package layer away from the array substrate.

Figure 6:
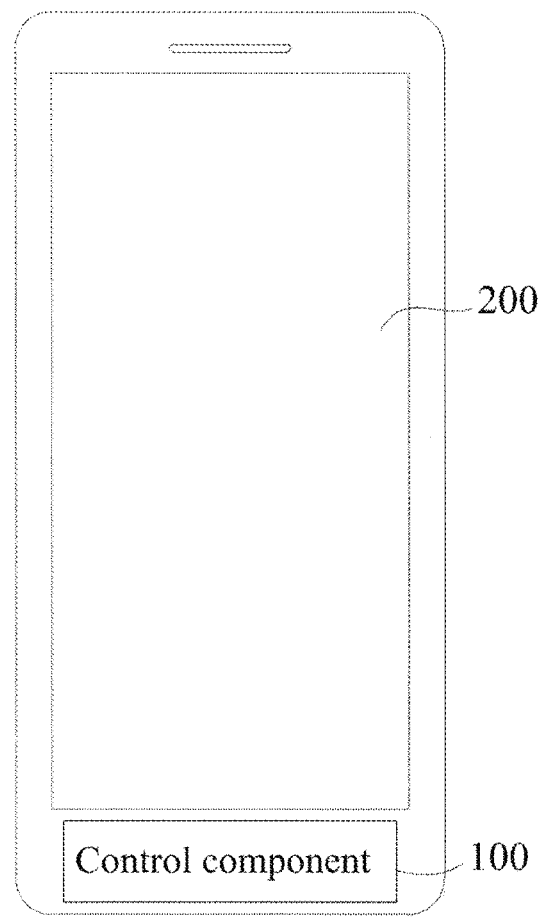
FIG. 6 is a schematic view showing a display device in an embodiment of this disclosure.

The present embodiment also provides a display device. FIG. 6 is a schematic view showing a display device in an embodiment of this disclosure. Referring to FIG. 6, the display device comprises a control component 100 and the display panel 200 according to any embodiments of the present disclosure. Specifically, the control component 100 is used to send a display control signal to the display panel 200 to control the display panel 200 to perform frame displaying. The display panel 200 may be a liquid crystal display panel or an organic electroluminescent display panel. If the display panel 200 is the liquid crystal display panel, then the display device also includes components such as a backlight module and the like, and the backlight module is used to provide the light source for the liquid crystal display panel. The display device may be a display device, such as a mobile phone, a television, a tablet computer or the like.

In the display device of this embodiment, the display panel 200 is driven by adopting the flexible circuit board, and the fixing member is disposed on the flexible circuit board, so that the second end of the flexible circuit board is bent toward the display area of the array substrate, and the projection of the flexible circuit board on the array substrate is located in the non-display area of the array substrate to ensure the narrow border or borderless property of the display panel 200. However, a drive circuit or a driving chip of the display panel 200 is manufactured on the flexible circuit board. So, compared with the GOA technology, the product yield is high, the production cost can be effectively reduced, and a low cost solution for achieving the narrow border is thus provided.

In some embodiments, the display panel 200 may be a Liquid Crystal Display panel (LCD panel), an Organic Electroluminescence Display panel (OLED panel), a Quantum Dot Light Emitting Diodes panel (QLED panel) and a curved panel.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A display panel, comprising:
an array substrate; and
a color filter substrate disposed opposite to the array substrate,
wherein the array substrate comprises a display area on which the color filter substrate is disposed comprising a plurality of active switches and a plurality of pixel units, and a non-display area surrounding the display area and comprising:
a flexible circuit board configured to drive the pixel units to display and disposed on a same side of the array substrate as the color filter substrate, wherein a first end of the flexible circuit board is disposed in the non-display area of the array substrate; and
a fixing member disposed on the flexible circuit board;
wherein the fixing member bends a second end of the flexible circuit board in a direction toward the display area of the array substrate, so that a projection of the flexible circuit board on the array substrate is located in the non-display area and no part of the flexible circuit board and the fixing member protrude beyond an edge of the array substrate; and
wherein the flexible circuit board comprises a flexible substrate, and a driving chip is disposed on a non-planar portion of the flexible substrate so as to minimize the non-display area.

2. The display panel according to claim 1, wherein the flexible circuit board is bent in a U shape.

3. The display panel according to claim 1, wherein the fixing member is a first fixing member, the first fixing member is disposed on one side of the flexible substrate provided with the driving chip, and the first fixing member is bonded to two ends of the flexible substrate through a first adhesive layer.

4. The display panel according to claim 3, wherein the first fixing member has a cuboid shape, and opposite two side surfaces of the first fixing member are bonded to the two ends of the flexible substrate.

5. The display panel according to claim 1, wherein the fixing member is a second fixing member, the second fixing member is disposed on one side of the flexible substrate away from the driving chip, and the second fixing member is bonded to the flexible substrate through a second adhesive layer.

6. The display panel according to claim 5, wherein the second fixing member has a U shape, and an inner side of the second fixing member is bonded to the flexible substrate.

7. The display panel according to claim 1, wherein a material of the fixing member is a rubber or foaming material.

8. A display device, comprising:
a control component; and
the display panel according to claim 1,
wherein the control component sends a display control signal to the display panel to control the display panel to perform frame displaying.

9. A display panel, comprising:
an array substrate; and
a color filter substrate disposed opposite to the array substrate,
wherein the array substrate comprises a display area on which the color filter substrate is disposed comprising a plurality of active switches and a plurality of pixel units, and a non-display area surrounding the display area comprising:
a flexible circuit board configured to drive the pixel units to display and disposed on a same side of the array substrate as the color filter substrate, wherein a first end of the flexible circuit board is disposed in the non-display area of the array substrate, the flexible circuit board comprises a flexible substrate, and a driving chip is disposed on a non-planar portion of the flexible substrate so as to minimize the non-display area; and
a fixing member disposed on the flexible circuit board;
wherein the fixing member bends a second end of the flexible circuit board in a direction toward the display area of the array substrate, so that a projection of the flexible circuit board on the array substrate is located in the non-display area and no part of the flexible circuit board and the fixing member protrude beyond an edge of the array substrate;
the fixing member is disposed on one side of the flexible substrate provided with the driving chip, the fixing member has a cuboid shape, a cube with a transversal cross section of an I-shape or a U shape; or, the fixing member is disposed on one side of the flexible substrate away from the driving chip, and the fixing member has a U shape.

10. The display panel according to claim 9, wherein the flexible circuit board is bent in a U shape.

11. The display panel according to claim 9, wherein the fixing member is a first fixing member, the first fixing member is disposed on one side of the flexible substrate provided with the driving chip, and the first fixing member is bonded to two ends of the flexible substrate through a first adhesive layer.

12. The display panel according to claim 11, wherein the first fixing member has a cuboid shape, and opposite two side surfaces of the first fixing member are bonded to the two ends of the flexible substrate.

13. The display panel according to claim 9, wherein the fixing member is a second fixing member, the second fixing member is disposed on one side of the flexible substrate away from the driving chip, and the second fixing member is bonded to the flexible substrate through a second adhesive layer.

14. The display panel according to claim 13, wherein the second fixing member has a U shape, and an inner side of the second fixing member is bonded to the flexible substrate.

15. The display panel according to claim 9, wherein a material of the fixing member is a rubber or foaming material.

* * * * *

UNITED STATES PATENT AND TRADEMARK OFFICE
CERTIFICATE OF CORRECTION

PATENT NO. : 11,275,280 B2
APPLICATION NO. : 16/634510
DATED : March 15, 2022
INVENTOR(S) : Hsu-Kang Lo Page 1 of 1

It is certified that error appears in the above-identified patent and that said Letters Patent is hereby corrected as shown below:

On the Title Page

Item (73), should read:
--HKC CORPORATION LIMITED, Shenzhen City, CN; CHONGQING HKC OPTOELECTRONICS TECHNOLOGY CO., LTD., Chongqing, CN--

Signed and Sealed this
Eleventh Day of October, 2022

Katherine Kelly Vidal
*Director of the United States Patent and Trademark Office*